US 6,640,942 B2

United States Patent
Wakita

(10) Patent No.: US 6,640,942 B2
(45) Date of Patent: Nov. 4, 2003

(54) SUSPENSION SUPPORT

(75) Inventor: Yasukuni Wakita, Osaka (JP)

(73) Assignee: Toyo Tire & Rubber Co., Ltd., Osaka (JP)

( * ) Notice: Subject to any disclaimer, the term of this patent is extended or adjusted under 35 U.S.C. 154(b) by 0 days.

(21) Appl. No.: 10/019,751

(22) PCT Filed: May 23, 2001

(86) PCT No.: PCT/JP01/04338
§ 371 (c)(1),
(2), (4) Date: Dec. 27, 2001

(87) PCT Pub. No.: WO01/94808
PCT Pub. Date: Dec. 13, 2001

(65) Prior Publication Data
US 2003/0102194 A1 Jun. 5, 2003

(30) Foreign Application Priority Data
Jun. 5, 2000 (JP) ......................................... 2000-167396

(51) Int. Cl.⁷ .................................................. F16F 9/00
(52) U.S. Cl. .................................. 188/321.11; 267/220
(58) Field of Search ...................... 188/321.11; 267/220, 267/140.11, 140.12, 219

(56) References Cited

U.S. PATENT DOCUMENTS

| 4,434,977 A | * | 3/1984 | Chiba et al. ............ 188/321.11 |
| 4,478,396 A | * | 10/1984 | Kawaura ..................... 267/220 |
| 5,024,461 A | | 6/1991 | Miyakawa et al. |
| 5,040,775 A | | 8/1991 | Miyakawa et al. |
| 5,064,176 A | | 11/1991 | Goto |
| 5,088,704 A | | 2/1992 | Kanda |
| 5,342,029 A | * | 8/1994 | Carter ......................... 267/220 |
| 5,664,650 A | * | 9/1997 | Kammel et al. ........ 188/321.11 |

FOREIGN PATENT DOCUMENTS

| DE | 43 26 197 A | 2/1994 |
| DE | 44 30 317 A | 2/1996 |
| DE | 195 43 995 A | 5/1997 |
| DE | 195 45 170 A | 6/1997 |
| DE | 195 45 170 A1 | 6/1997 |
| DE | 297 22 553 U | 2/1998 |
| DE | 198 03 174 A | 9/1998 |
| EP | 0 985 565 A | 3/2000 |
| FR | 2 672 548 A | 8/1992 |
| JP | 5-50818 | 3/1993 |
| JP | 16742 A | 3/1994 |
| JP | 8-233019 | 9/1996 |
| JP | 11-94007 | 4/1999 |
| JP | 11-210808 | 8/1999 |

* cited by examiner

Primary Examiner—Christopher P. Schwartz
Assistant Examiner—Melanie Torres
(74) Attorney, Agent, or Firm—Knobbe Martens Olson & Bear, LLP

(57) ABSTRACT

The present invention is intended to reduce the weight of the suspension support without increasing its production cost. An inner and outer cylinders (1), (2) are made of aluminum. Out of the upper and lower inner circumferential flanges (6), (7) which hold vertically a rubber elastomer (3) in between, one flange is formed on an open condition when the outer cylinder (2) is forged, and after inserting the rubber elastomer (3) from the opening (11) a circumferential edge of the opening (11) is inwardly folded to form the inner circumferential flanges (6), (7), thus completing a product.

9 Claims, 8 Drawing Sheets

SUSPENSION SUPPORT

This application is the U.S. National Phase under 35 U.S.C. § 371 of International Application PCT/JP01/04338, filed May 23, 2001, which claims priority to Japanese Patent Application No. 2000-167396, filed Jun. 5, 2000. The International Application was not published under PCT Article 21(2) in English.

FIELD OF THE INVENTION

This invention relates to a suspension support disposed at an attachment portion of a buffer to a vehicle.

DESCRIPTION OF THE RELATED ART

In general, in a suspension system of an automobile, etc., a so-called suspension support is disposed at an attachment portion of a buffer to a vehicle body, in order to control vibration, etc. transferred from wheels to the vehicle body.

FIGS. 9 and 10 show an example of the suspension support. FIG. 9 is a bottom plan view of the suspension support. FIG. 10 is a sectional-view taken along the line A—A of FIG. 9. The suspension support comprises an inner cylinder 101 made of steel in which a piston rod of the buffer is inserted and secured, an outer cylinder 102 made of steel attached to the vehicle body side, and a rubber elastomer 103 interposed between the inner and outer cylinders to dampen input vibration. The outer cylinder 102 is made up of outer circumferential flanges 106, 107, which are molded in one piece by spot welding 108, of upper and lower fittings 104, 105 that serve to axially compress the rubber elastomer 103.

Incidentally, in order to reduce energy consumption of automobiles in recent years, countermeasures against a weight reduction of each component have been required. Accordingly, it is also required to reduce the weight of the suspension support and the like.

DISCLOSURE OF THE INVENTION

The present invention is intended to reduce weight of the suspension support comprising the aforementioned inner cylinder, outer cylinder and rubber elastomer by making use of an outer cylinder made of aluminum, instead of conventional steel outer cylinder.

However, as for the suspension support of the type that holds the rubber elastomer vertically between the upper and lower fittings the cost of material will becomes dear only by changing the upper and lower fittings into aluminum ones. On the other hand, in case where the upper and lower fittings are molded in one piece, it is difficult to hold the rubber elastomer between both fittings molded as it is.

Therefore, according to the invention, the aforementioned outer cylinder is molded in one piece of aluminum into a shape with a cylindrical portion enveloping the rubber elastomer, an inner circumferential flange formed inwardly in the direction perpendicular to the axial direction at one axial side of the cylindrical portion, and an opening capable of inserting the rubber elastomer at the other axial side of the cylindrical portion, and the aforementioned rubber elastomer is axially held between the opening circumferential edge inwardly folded and formed by post-working and the inner circumferential flange.

The outer cylinder made of aluminum with good workability can easily be formed according to the folding working. Besides, due to reduction in the number of components and omission of spot welding process, reduction of production costs can be materialized more than making up for drawbacks of costly materials. Furthermore, the wall thickness of the outer cylinder must be made thicker to secure the same strength as that of the steel outer cylinder. But the thicker the wall thickness, the more the outer cylinder will be contributable to damping.

In addition, if the inner cylinder is also made of aluminum, the weight of the suspension support can further be reduced.

If there exist irregularities at the axial ends of the rubber elastomer, beating sounds generated when the rubber elastomer comes in contact with the inner circumferential flange of the outer cylinder can be avoided. That is, in case where the axial ends of the rubber elastomer is flat, an opening is left between the rubber elastomer and the outer cylinder when a large load is transferred at the time of bounding and rebounding, which may cause large beating sounds at the time of restoration when the rubber elastomer in conjunction with the outer cylinder is pressed against the inner circumferential flange.

On the contrary, when a convex portion is formed on the axial ends of the rubber elastomer and the convex portion is kept always in contact with the inner circumferential flange, a large load is gradually absorbed and damped, thus it is possible to prevent beating sounds effectively.

BEST MODE FOR CARRYING OUT THE INVENTION

Figure 1:
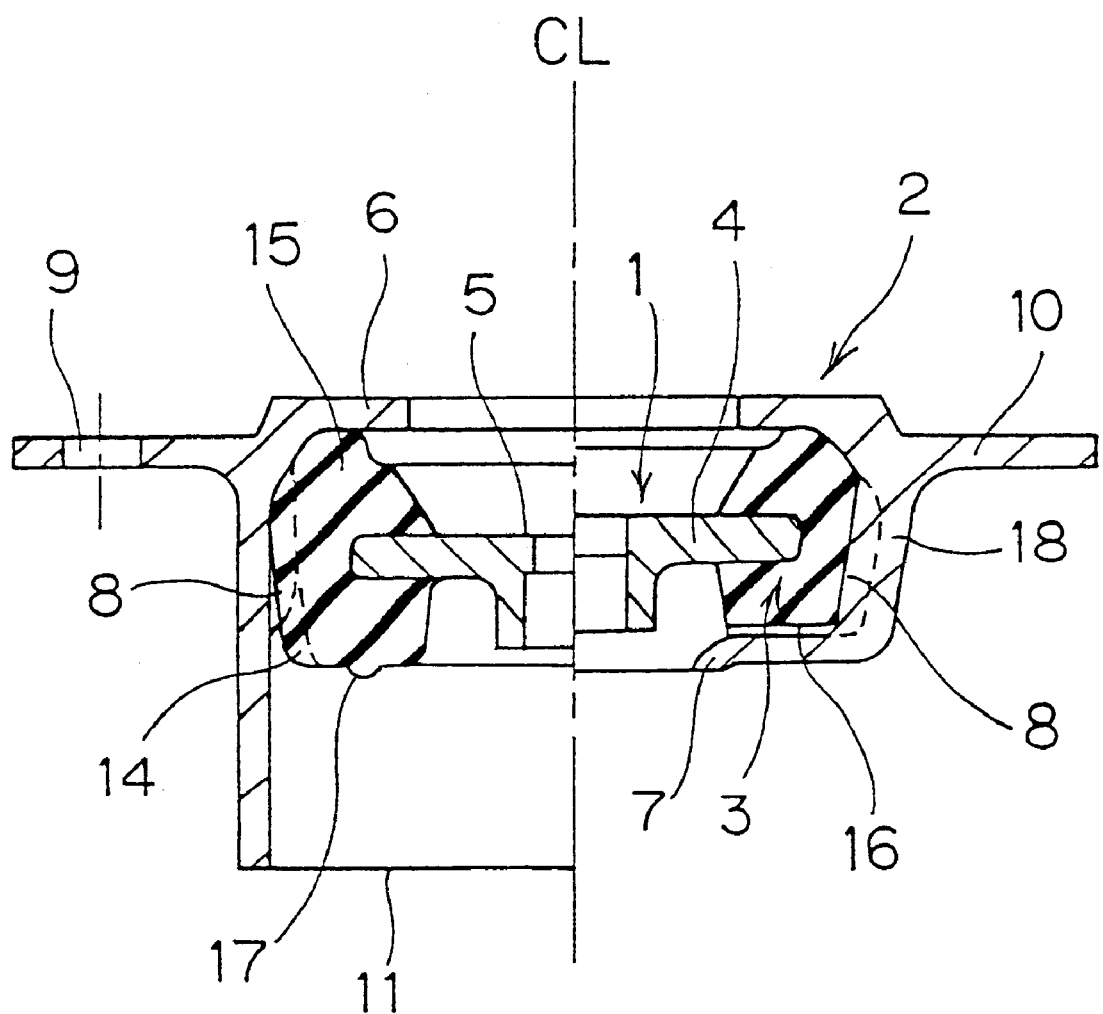
FIG. 1 is a sectional view of a suspension support according to the present invention.
Figure 2:
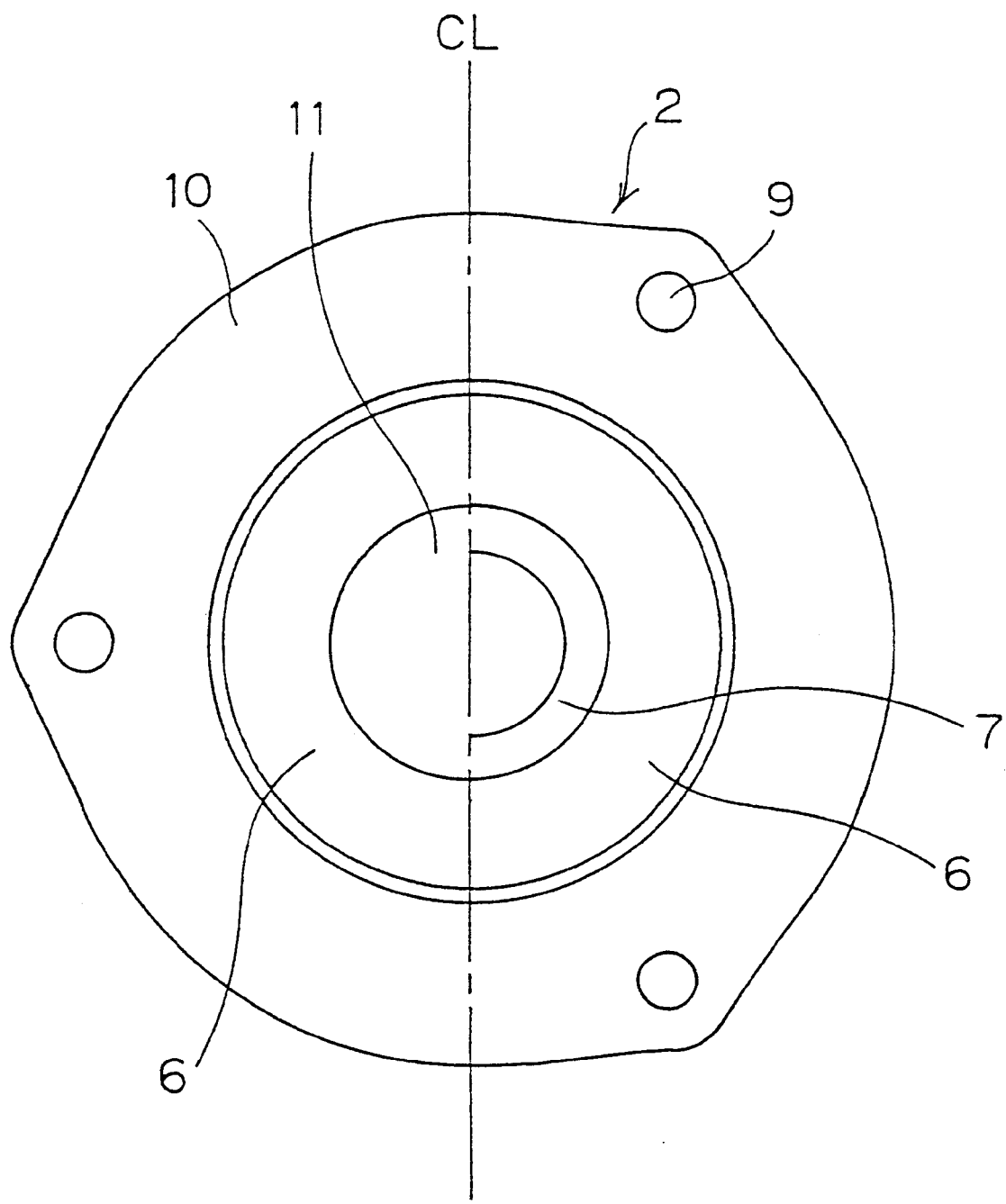
FIG. 2 is a top plan view of an outer cylinder.
Figure 3:
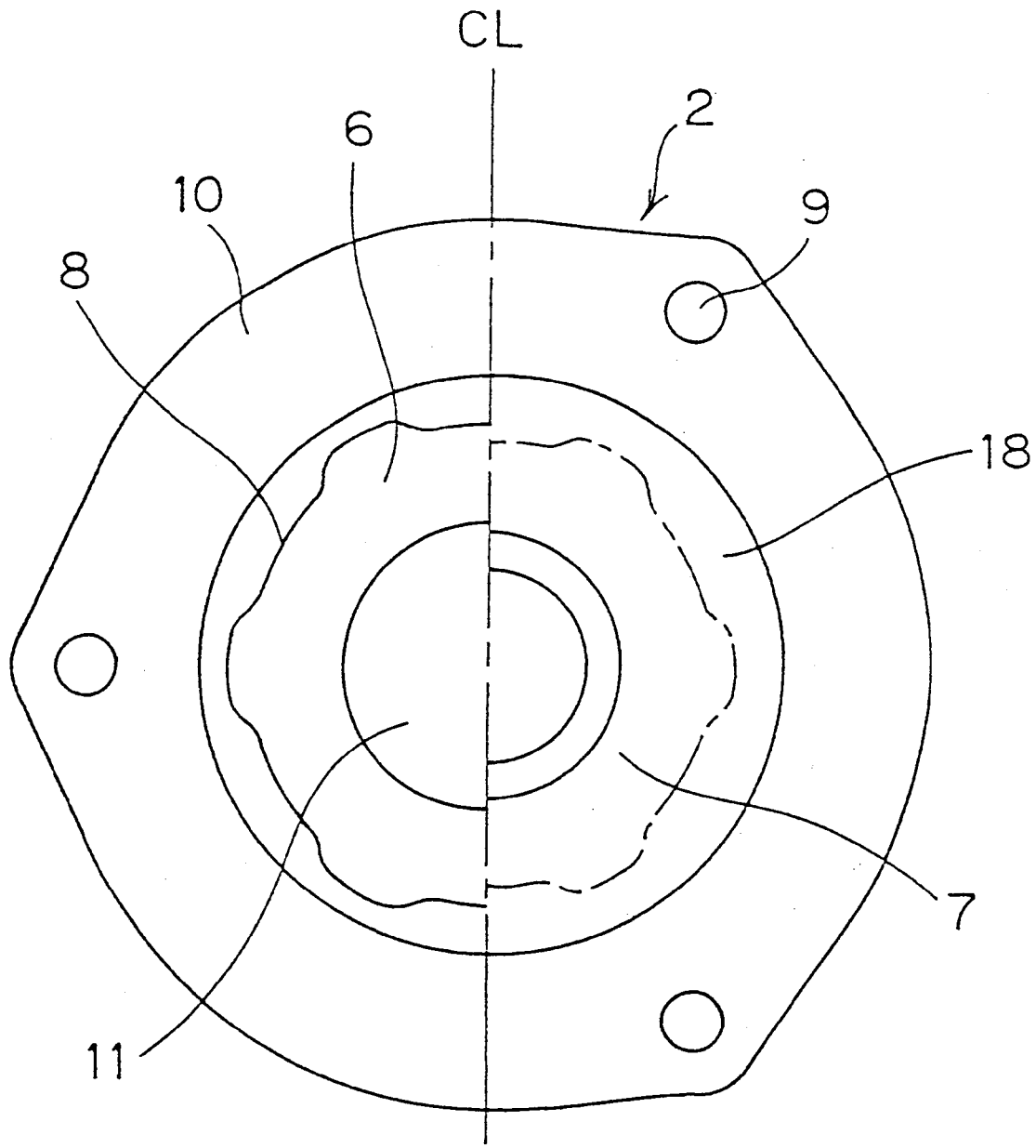
FIG. 3 is a bottom plan view of the outer cylinder.
Figure 4:
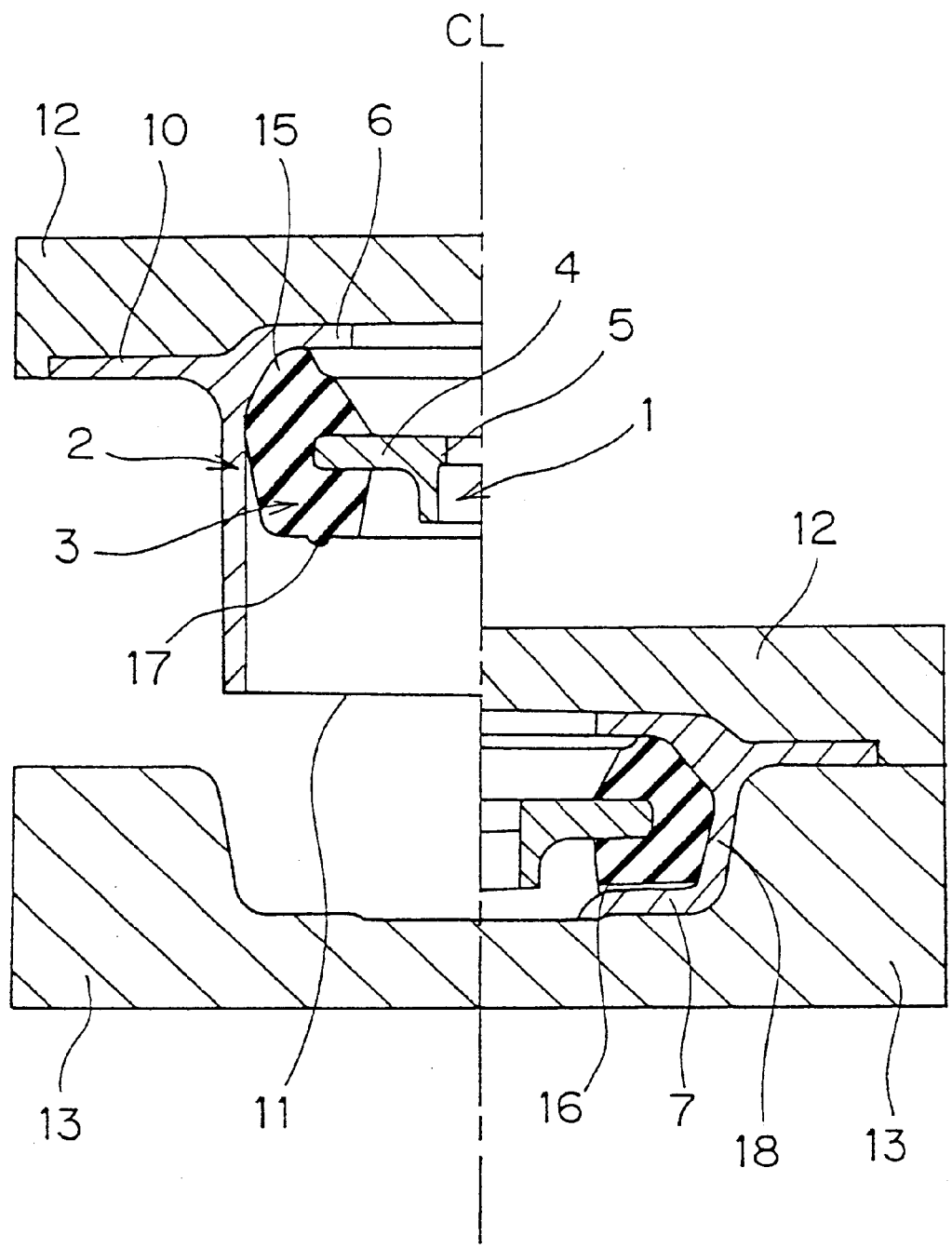
FIG. 4 is a view explaining the folding working of the outer cylinder.
Figure 5:
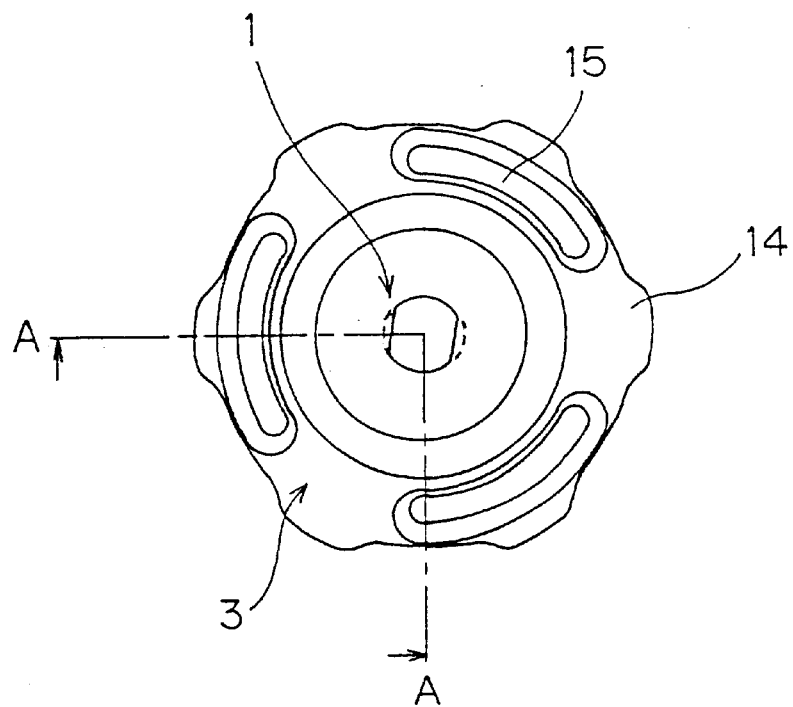
FIG. 5 is a top plan view of a rubber elastomer molded integrally with an inner cylinder.
Figure 6:
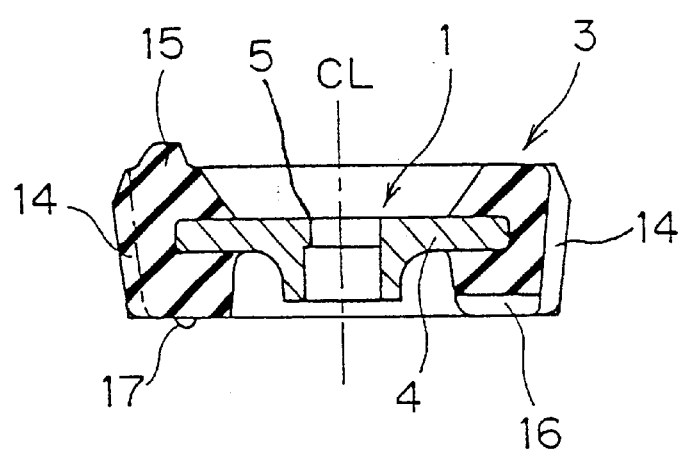
FIG. 6 is a sectional view taken along the line A—A of FIG. 5.
Figure 7:
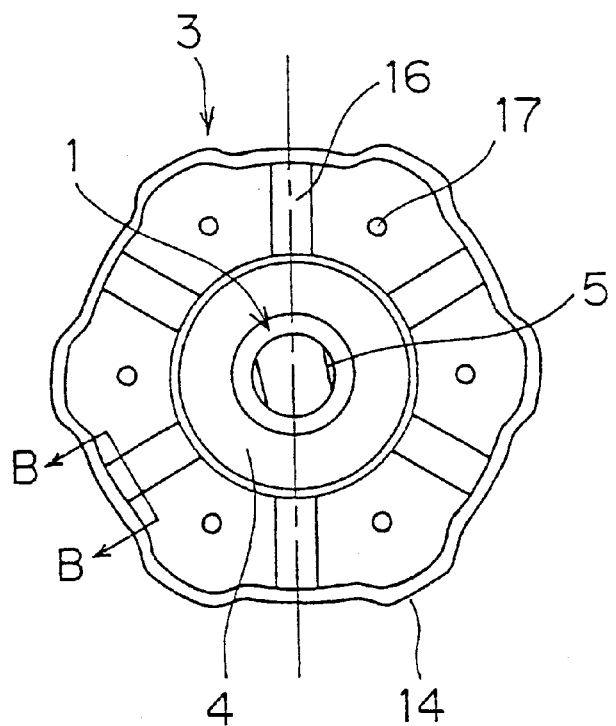
FIG. 7 is a bottom plan view of FIG. 5.
Figure 8:
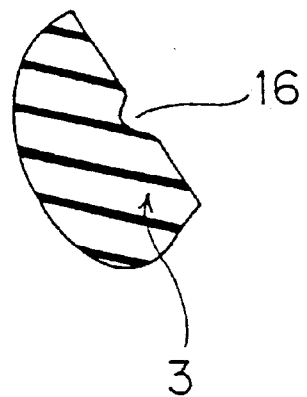
FIG. 8 is a sectional view taken along the line B—B of FIG. 7.
Figure 9:
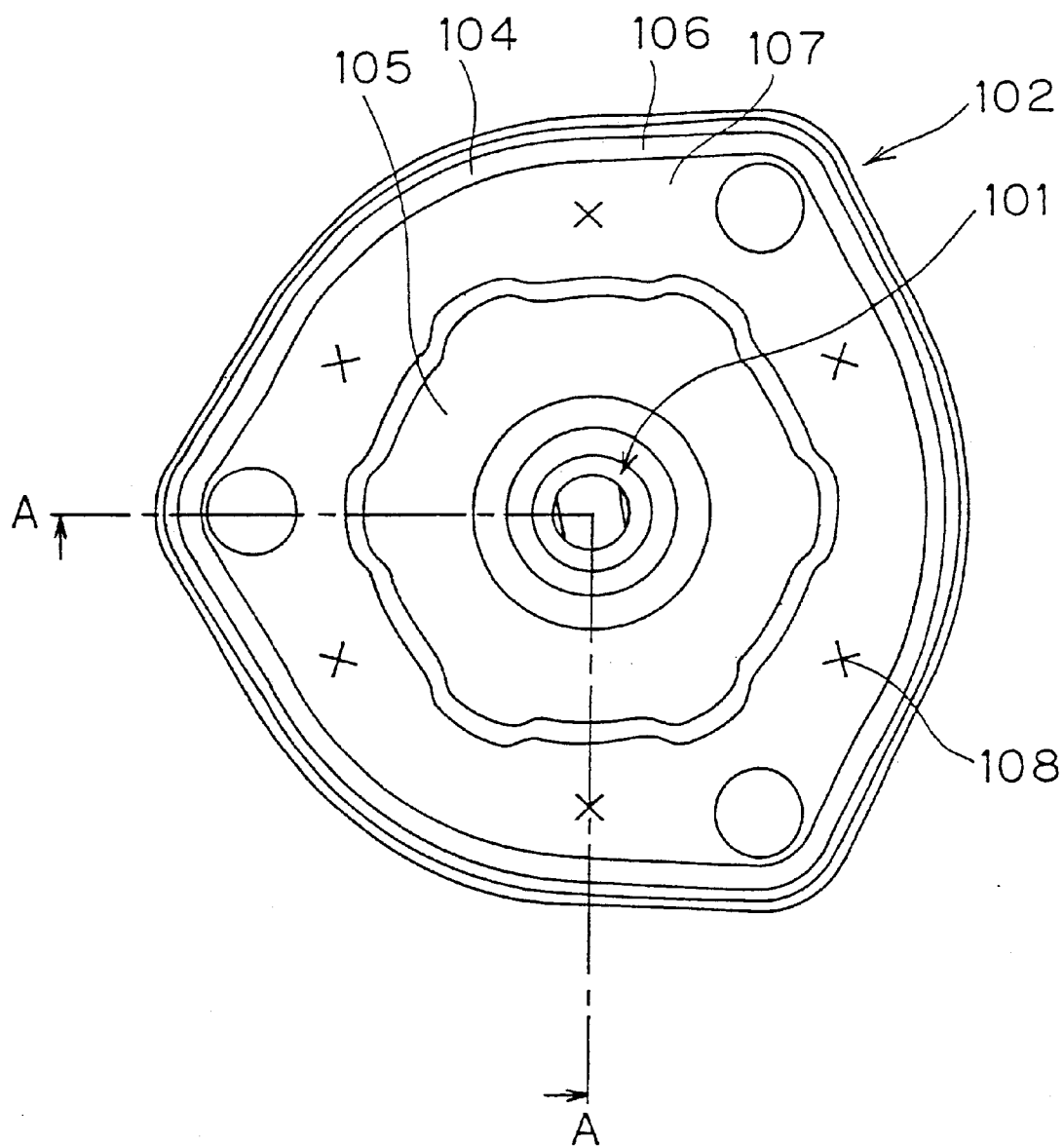
FIG. 9 is a bottom plan view of conventional suspension support.
Figure 10:
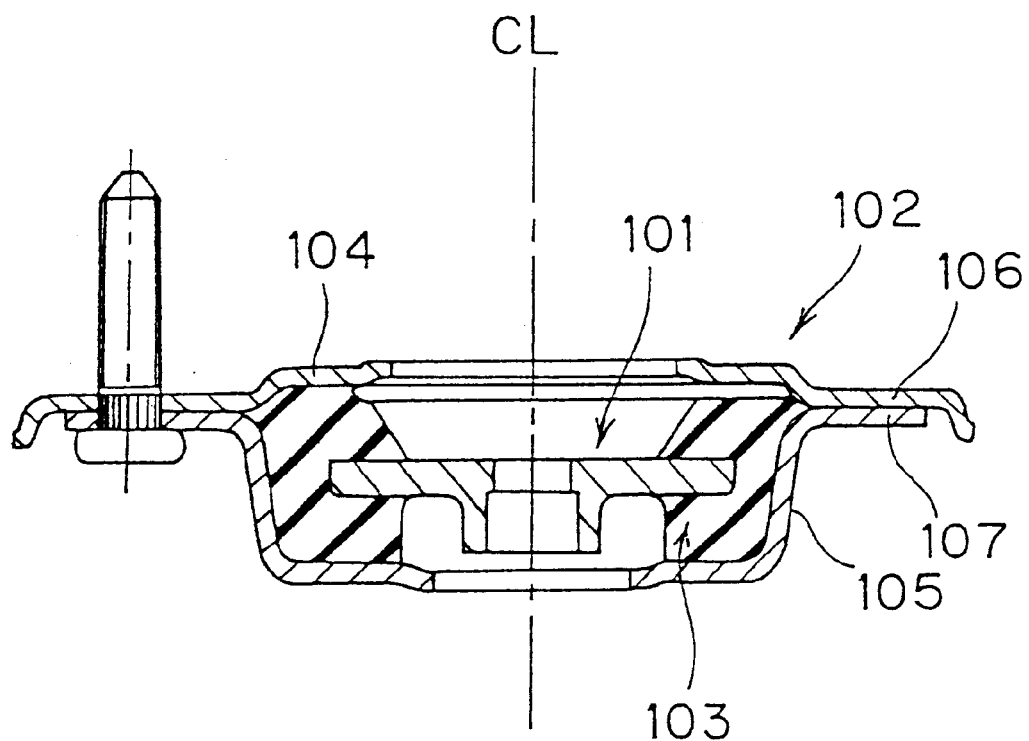
FIG. 10 is a sectional view taken along the line A—A of FIG. 9.

Embodiments for carrying out a suspension support of the present invention will be described below with reference to the drawings. FIG. 1 is a sectional view of the suspension support, a left half sections hows the outer cylinder 2 under forming condition and a right half section shows the completed condition thereof. FIG. 2 is a top plan view of the outer cylinder 2, a left half section shows the forming condition thereof and a right half section shows the completed condition thereof. FIG. 3 is a bottom plan view of the outer cylinder 2, a left half section shows the forming condition thereof and a right half section shows the completed condition thereof. FIG. 4 is a view explaining the folding working for the outer cylinder 2, a left half section shows the forming condition thereof and a right half section shows the completed condition thereof. FIG. 5 is a top plan view of a rubber elastomer integral with an inner cylinder 1. FIG. 6 is a sectional view taken along the line A—A thereof. FIG. 7 is a bottom plan view thereof. FIG. 8 is a sectional view taken along the line B—B thereof.

The suspension support comprises an inner cylinder 1 made of aluminum, in which a piston rod of a buffer is inserted and fixed, an outer cylinder 2 made of aluminum attached to the vehicle body side, and a rubber elastomer 3 interposed between the inner and outer cylinders 1, 2 to dampen input vibration due to axial compression.

The inner cylinder 1 is a cylindrical forged item, on the inner circumferential surface at the upper edge of which a protrusion 5 is formed so as to set to a sectional shape of the piston rod, which is formed by cutting a part of a circle, to prevent the inserted piston rod from turning. An outer circumferential flange 4 expanding outwardly in the direction square to the axial direction is molded in one piece at the upper edge of the inner cylinder 1, and the outer circumferential flange 4 is embedded at the axial intermediate position of the rubber elastomer 3.

The outer cylinder 2 comprises a cylindrical portion 18 covering an outer circumferential surface of the rubber elastomer 3 in the direction perpendicular to the axial direction, annular upper and lower inner circumferential flanges 6, 7 formed inwardly in the direction perpendicular to the axial direction at the upper and lower ends of the cylindrical portion 18, an annular outer circumferential flange 10 formed outwardly in the direction perpendicular to the axial direction at the upper end of the cylindrical portion 18, and these components are molded in one piece by aluminum forging.

However, the inner circumferential flange 7 on the lower side is formed by the post-working after forging. That is, the inner circumferential flange 7 on the lower side is formed with the lower end of the cylindrical portion 18 axially extended at the time of forging, and it is possible to insert the rubber elastomer 3 from an opening 11, which is formed inside by the cylindrical extending portion (opening circumferential edge), into the cylindrical portion 18. The inner circumferential flange 7 is formed by folding inwardly the opening circumferential edge is folded inwardly after inserting the rubber elastomer 3.

Irregularities 8 are formed circumferentially on the inner circumferential surface of the cylindrical portion 18 to prevent the rubber elastomer 3 from turning. Bolt holes 9 are formed on the outer circumferential flange 10 to attach the flange 10 to a vehicle body.

As shown in FIGS. 5, 6, 7 and 8, the rubber elastomer 3 is formed in the form of a ring, and at the axial intermediate position on the inner circumferential surface, the outer circumferential flange 4 of the inner cylinder 1 is embedded and vulcanized there. The rubber elastomer 3 is interposed between the outer circumferential flange 4 and the upper side inner circumferential flange 6 of the outer cylinder 2, and between the outer circumferential flange 4 and the lower side inner circumferential flange 7 of the outer cylinder 2 under compressed condition. Irregularities 14 are formed on the outer circumferential surface of the rubber elastomer 3 to engage with the irregularities 8 on the inner circumferential surface of the outer cylinder 2 so as not to be turned when a predetermined torque is applied for fixing the piston rod.

A convex portion 15 is formed at three places circumferentially on the top surface of the rubber elastomer 3 so as not to be separated from the inside of the outer cylinder 2 due to vibration. Six radial grooves 16 are formed radially on the lower surface of the rubber elastomer 3, semi-spherical protrusions 17 are formed in between the grooves 16 to secure frictional force for preventing rotation, so as not to be separated from the inner surface of the outer cylinder 2 due to a large load.

The procedure of assembling the suspension support is described below. In the first place, as mentioned above, under a condition where the lower side inner circumferential flange 7 is open, the outer cylinder 2 is forged using an aluminum, and the rubber elastomer 3 integral with the inner cylinder 1 is inserted from the opening 11. At this time, the diameter of the rubber elastomer 3 shall be the same as that of the opening 11 so that the rubber elastomer 3 can be inserted without being press-fitted.

After inserting the rubber elastomer 3, the circumferential edge of the opening 11 is folded inwardly to form the inner circumferential flange 7, and a product is completed by holding the rubber elastomer 3 between the upper and lower inner circumferential flanges 6, 7. At this time, when axial distance between the inner circumferential flanges 6, 7 at both ends is shorter than axial length of the rubber elastomer 3, the rubber elastomer 3 will be compressed vertically. Since the rubber elastomer 3 is liable to expand radially (direction perpendicular to the axial direction) due to this vertial compression, it will also be compressed radially. Besides, since convex portions have been formed on the upper and lower sides of the rubber elastomer 3, an opening can be avoided between the outer cylinder 2 and the rubber elastomer 3 even when a large shock is given.

The circumferential edge of the opening 11 is folded by putting between, for example, dies 12, 13 of a predetermined shape as shown in FIG. 4. Consequently, the circumferential edge of the opening 11 will be deformed according to the inside contour of the die 13 due to high ductility of aluminum, so that it can be formed into a predetermined shape. In FIG. 4, a left half section shows a condition before being held by the dies 12, 13, and a right half section shows a condition after having been held.

The inner circumferential flange 7 of the outer cylinder 2 can be formed according to either pressing or deep drawing process.

The present invention can be properly modified within the scope of the invention without limiting to the aforementioned embodiments. For example, the inner cylinder 1 may be made of steel instead of aluminum.

It is obvious from the description above, according to the present invention, a weight reduction of outer cylinder made of aluminum can contribute to energy-saving. At this time, while keeping the axial one side of the outer cylinder open, the opening circumferential edge thereof is inwardly folded and formed after the rubber elastomer has been inserted, thus its forming and so forth can be performed easily.

INDUSTRIAL APPLICABILITY

The suspension support of the present invention may be used appropriately as being disposed at an attachment portion of a buffer to a vehicle.

What is claimed is:

1. A suspension support for supporting a buffer for a vehicle body, comprising:
   an inner cylinder having an outward flange;
   an outer cylinder adapted to be attached to a vehicle body, said outer cylinder having an upper inward flange, a lower inward flange, a side wall, and an outward flange, said outer cylinder being a molded single piece, one of said upper inward flange or said lower inward flange being formed by bending, said side wall being slanted inward by the bending of said upper or lower inward flange; and
   a rubber elastomer interposed and pressed between the inner cylinder and the outer cylinder and between the upper inward flange and the lower inward flange, said a rubber elastomer interposed and pressed between the inner cylinder and the outer cylinder and between the upper inward flange and the lower inward flange, said rubber elastomer having an upper surface and a lower surface at least one of which is a convex surface, said convex surface being compressed by the upper or lower inward flange of the outer cylinder which is formed by bending, said rubber elastomer having a side face pressed by the side wall of the outer cylinder by the bending of the upper or lower inward flange.

2. The suspension support according to claim 1, wherein the outer cylinder is made of aluminum.

3. The suspension support according to claim 1, wherein the inner cylinder is made of aluminum.

4. The suspension support according to claim 1, wherein the rubber elastomer has a semi-spherical protrusions on its surface before being restrained between the upper and lower inward flanges.

5. The suspension support according to claim 1, wherein the side face of the rubber elastomer is a convex surface, and the side wall of the outer cylinder has an inner wall having a shape to which the convex surface of the rubber elastomer is fitted.

6. A method of producing a suspension support for supporting a buffer for a vehicle body, comprising:

forming an inner cylinder having an outward flange;

integrating a rubber elastomer with the inner cylinder around the outward flange of the inner cylinder, said rubber elastomer having an upper surface and a lower surface at least one of which is a convex surface;

forming, as a single piece by molding, an outer cylinder adapted to be attached to a vehicle body, said outer cylinder having a first inward flange at one end, a side wall, and an outward flange, said outer cylinder having an extended wall at the other end;

placing the rubber elastomer with the inner cylinder inside the outer cylinder through the other end of the outer cylinder to interpose the rubber elastomer between the inner cylinder and the outer cylinder; and inwardly bending the extended wall of the outer cylinder to form a second inward flange, thereby restraining the rubber elastomer between the first inward flange and the second inward flange, wherein the convex surface of the rubber elastomer is compressed by the extended wall by bending, and a side face of the rubber elastomer is pressed by the side wall of the outer cylinder by the bending of the extended wall.

7. The method according to claim 6, wherein the outer cylinder is made of aluminum.

8. The method according to claim 6, wherein the inner cylinder is made of aluminum.

9. The method according to claim 6, wherein the rubber elastomer has a semi-spherical protrusions on its surface before being restrained between the first and second inward flanges.

* * * * *